United States Patent [19]

Makino et al.

[11] Patent Number: 4,752,548

[45] Date of Patent: Jun. 21, 1988

[54] LIGHT-SENSITIVE BISAZULENIUM SALT COMPOUND COMPOSITIONS AND ELECTROPHOTOGRAPHIC PHOTORECEPTORS FORMED THEREWITH

[75] Inventors: Naonori Makino; Seiji Horie; Shu Watarai; Hideo Sato, all of Kanagawa, Japan

[73] Assignee: Fuji Photo Film Co., Ltd., Kanagawa, Japan

[21] Appl. No.: 927,973

[22] Filed: Nov. 7, 1986

[30] Foreign Application Priority Data

Nov. 7, 1985 [JP] Japan .................. 60-249687

[51] Int. Cl.[4] .................................... G03G 5/06
[52] U.S. Cl. .................................. 430/58; 430/77; 430/79; 430/83
[58] Field of Search ............... 430/72, 74, 79, 83, 430/58

[56] References Cited

U.S. PATENT DOCUMENTS

| | | | |
|---|---|---|---|
| 3,542,546 | 11/1970 | Fox | 430/79 |
| 4,423,130 | 12/1983 | Horie et al. | 430/79 |
| 4,565,761 | 1/1986 | Katagiri et al. | 430/83 |
| 4,594,304 | 6/1986 | Watarai et al. | 430/74 |

*Primary Examiner*—John L. Goodrow
*Attorney, Agent, or Firm*—Sughrue, Mion, Zinn, Macpeak, and Seas

[57] ABSTRACT

Light-sensitive compositions are provided, containing at least one bisazulenium salt compound of the general formulae (1) and (2):

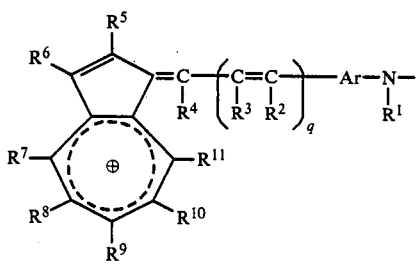

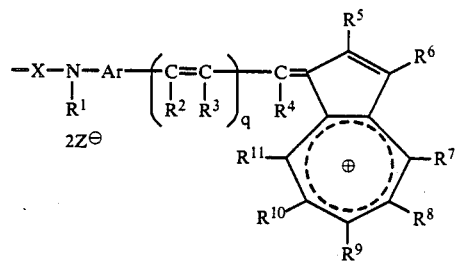

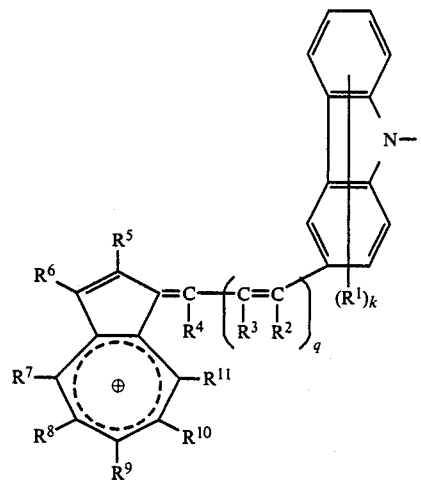

wherein all the symbols are defined in the specification.

Electrophotographic photoreceptors containing the present composition have high sensitivity and stable potential characteristic in repeated use. The present compositions are further usable in optical information-recording media, and the media containing the present composition have sufficient preservation stability, high sensitivity and sufficient S/N ratio.

15 Claims, No Drawings

LIGHT-SENSITIVE BISAZULENIUM SALT COMPOUND COMPOSITIONS AND ELECTROPHOTOGRAPHIC PHOTORECEPTORS FORMED THEREWITH

FIELD OF THE INVENTION

The present invention relates to light-sensitive compositions containing new bisazulenium salt compounds, and to electrophotographic photoreceptors utilizing the photoconductive properties of the light-sensitive compositions, and further relates to optical information-recording media in which recording and reproduction proceed by the action of high density energy beams.

BACKGROUND OF THE INVENTION

In electrophotography, an electrophotographic photoreceptor comprising a support which is coated with a photoconductive material in which the electric resistance varies in accordance with the amount of the exposure which is imparted thereto during image exposure is employed, as described in Carlson's U.S. Pat. No. 2,297,691. The photoconductive material is, in general, charged with a uniform surface electric charge in a dark place, after dark adaptation for an appropriate period of time. Next, this material is imagewise exposed with an irradiation pattern whereby the surface electric charge is reduced in accordance with the relative energy contained in the respective parts of the irradiation pattern. The surface electric charge or the electrostatic latent image which remains on the surface of the photoconductive layer (electrophotographic light-sensitive layer) is thereafter brought into contact with an appropriate electroscopic displaying substance or a toner to form a visible image.

The toner is contained in an insulating solution or in a dry carrier, and in both cases, the toner may be applied on the surface of an electrophotographic light-sensitive layer in accordance with the electric charge pattern. The displaying substance thus applied on the surface may be fixed thereon by heat, pressure, solvent vapor or the like known means. The electrostatic latent image may be transferred to a second support (such as paper, film or the like). In the same manner, the electrostatic latent image which is transferred to the second support may be developed thereon.

In electrophotography, fundamental characteristics which are required in the electrophotographic photoreceptors are that (1) the photoreceptor may be charged to an appropriate potential in a dark place, (2) the electric charge is hardly lost in the dark place, and (3) the electric charge may rapidly be erased by light irradiation.

Photoconductive materials which have heretofore been used in electrophotographic photoreceptors are selenium, cadmium sulfide and zinc oxide.

Although these inorganic substances have various merits, they have, in fact, various defects. For example, selenium which until now has mainly been used, sufficiently satisfies the aforesaid conditions (1) through (3), but has various defects in that it is complicated to manufacture, its manufacturing cost is high, it is lacking in flexibility, it can hardly be formed into a belt-like article, it is sensitive to heat and mechanical shock and special attention is required for the handling thereof. Cadmium sulfide or zinc oxide, when used as the photoconductive material in an electrophotographic photoreceptor, is dispersed in a binder of a resin and thus can be easily manufactured, but both of these materials are mechanically defective with respect to smoothness, hardness, tensile strength and abrasion resistance. Therefore, cadmium sulfide and zinc oxide are scarcely fit for repeated use.

In order to eliminate the defects of these inorganic substances, electrophotographic photoreceptors of various organic substances have been proposed and some have actually been used. For example, there are electrophotographic photoreceptors comprising poly-N-vinylcarbazole and 2,4,7-trinitrofluoren-9-one (U.S. Pat. No. 3,484,237); poly-N-vinylcarbazole as sensitized with a pyrylium salt type dye (Japanese Patent Publication No. 25658/73); electrophotographic photoreceptors mainly comprising an organic pigment (Japanese Patent Application (OPI) No. 37543/72) (the term "OPI" as used herein refers to a "published unexamined Japanese patent appication"); and electrophotographic photoreceptors mainly comprising an eutectic complex of a dye and a resin (Japanese Patent Application (OPI) No. 10785/72).

These electrophotographic photoreceptors of organic substances may easily be manufactured by suitably selecting the binder to be used together with the organic substance and coating the mixture on a proper support, and therefore, the productivity is extremely high and inexpensive photoreceptors may be provided. Further, the mechanical characteristics and the flexibility may be improved, and the light-sensitive wavelength may freely be controlled by selecting the dye and the organic pigment to be used. On the contrary, however, the light sensitivity is low and the photoreceptors are scarcely fit for repeated use, and therefore, they do not sufficiently satisfy the necessary characteristics.

In another area of technology, a recording method has been developed where a beam of high energy density is irradiated onto an information-recording medium to vary the physical constants thereof such as percent transmission, reflectivity or refractive index for the purpose of recording the necessary information in the medium. This recording method has numerous advantages in that a contrasting image of an extremely high resolving power may be formed, addition of further information is possible, and simultaneous exposure and recording are possible. The method is suitable for recording an output of an electronic computer or a time system signal is transferred, and therefore, the method is applied to COM (computer output micro), microfacsimile, printing original, photo-disc, etc.

For instance, the recording medium to be used in photo-disc technology contains optically detectable small pits of about 1 micron or so in a spiral form or a circular track form, and information of high density may be recorded therein. In the writing of the information in the disc of this kind, a laser which is focused on the surface of the laser-sensitive layer is scanned to form pits only on the portions of the surface thereof which are irradiated with the laser ray, whereupon the pits are formed in a spiral form or a circular track form. In a heat mode-recording system, the laser-sensitive layer absorbs heat energy by the laser beam irradiation, whereupon small pits are formed in the laser-irradiated parts by evaporation or fusion of the layer.

The information which is recorded in the photodisc in the manner as described above is detected by scanning the laser along the track and reading the optical variation between the parts where the pits are formed and the other parts where the pits are not formed.

Conventional information-recording media for heat mode-recording, which have heretofore been used, comprise a recording layer of a thin film made of metal and/or metal oxide semi-metal dielectrics or of a thin film containing a self-oxidizable binder and a dye. The recording layer is provided on a plastic or the like transparent support, and a protective layer is coated on the recording layer.

However, thin films comprised mainly of an inorganic substance, which have been used in conventional recording media, have high reflectivity to the laser ray and, therefore, have a number of problems in that the laser utilization efficiency is low and a high sensitivity characteristic cannot be attained or the output of the laser ray in the recording is extremely increased.

On the other hand, organic compounds become unstable with a shift of the absorption characteristic to the long wavelength range and they often decompose with a slight increase in temperature. Thus, these compounds have various problems when used in thin films for recording layers.

The information-recording media must have various characteristics which are required for DRAW (direct read and write), such as a high absorption efficiency to the laser ray which is used, a sufficient reflectivity for the focal control in the information reading, and a high stability of the recorded image. However, recording media which have an organic thin film and which are satisfactory for practical use have not as yet been developed up to the present.

SUMMARY OF THE INVENTION

One object of the present invention is to provide light-sensitive compositions which may be applied to various kinds of photoreceptors and optical information recording media.

Another object of the present invention is to provide electrophotographic photoreceptors which have high sensitivity, high durability and stable potential characteristic in repeated use.

Still another object of the present invention is to provide optical information-recording media having sufficient preservation stability, high sensitivity and sufficient S/N ratio.

To achieve the foregoing objects and in accordance with its purpose, the present invention provides a light-sensitive composition which satisfies the aforesaid objects and which contains at least one compound selected from bisazulenium salt compounds of the following general formulae (1) and (2):

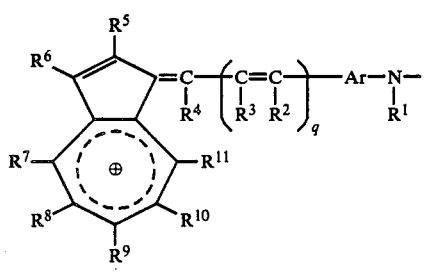

(1)

-continued

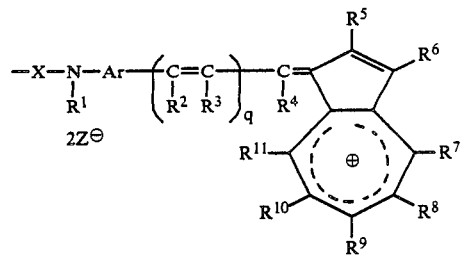

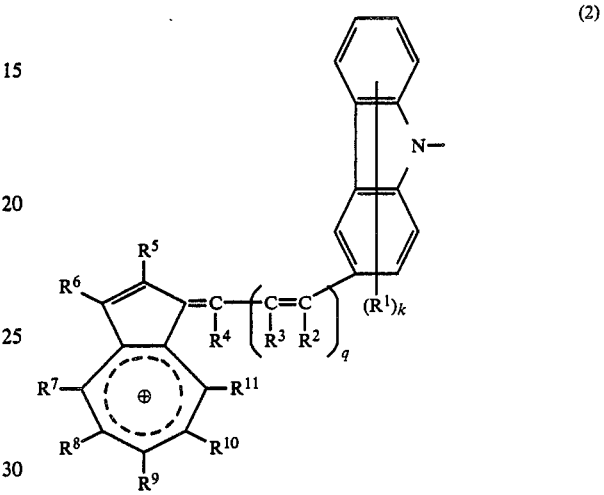

(2)

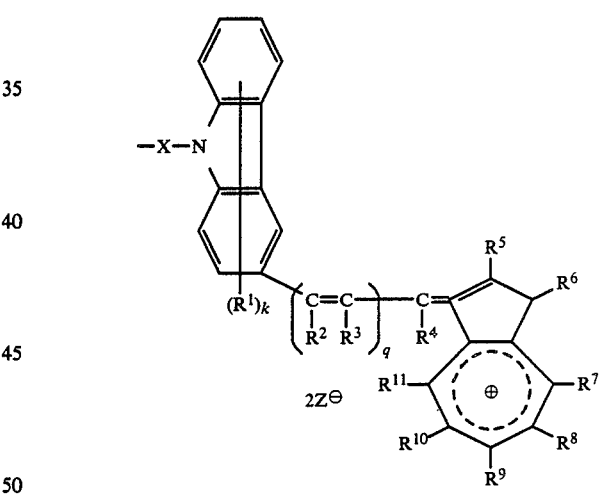

In the above general formulae (1) and (2), $R^1$ represents an alkyl group, an aralkyl group or an aryl group or a substituted group thereof.

Two $R^1$s in the general formula (1) may be bonded to each other to form a nitrogen-containing heterocyclic group.

$R^1$ in the general formula (2) further represents a hydrogen atom or a halogen atom.

$R^2$ and $R^3$ each represents a hydrogen atom, a halogen atom, an alkyl group, an aryl group or an aralkyl group or a substituted group thereof.

$R^4$ represents a hydrogen atom, an alkyl group, an aryl group or an aralkyl group or a substituted group thereof.

$R^5$, $R^6$, $R^7$, $R^8$, $R^9$, $R^{10}$ and $R^{11}$ each represents a hydrogen atom, a halogen atom, an alkyl group, an alkoxy group, an aryl group, an aryloxy group, an aralkyl group, an acyl group, a carboxyl group, an alkali metal-carboxylato group, a carbamoyl group, a sulfonic acid group, an alkali metal-sulfonato group, a sulfamoyl group, a nitro group, a cyano group, an amino group or a hydroxyl group or a substituted group thereof.

At least one combination selected from the combinations of $R^5$ and $R^6$, $R^7$ and $R^8$, $R^8$ and $R^9$, $R^9$ and $R^{10}$, and $R^{10}$ and $R^{11}$ may optionally form a substituted or unsubstituted aromatic ring.

X represents an atomic group having the general formula (3):

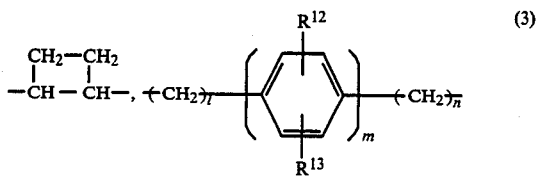

wherein $R^{12}$ and $R^{13}$ each represents a hydrogen atom, a halogen atom, an alkyl group, an alkoxy group, an aryl group or an aryloxy group or a substituted group thereof, and $R^{12}$ and $R^{13}$ may be bonded to form a condensed polycyclic aromatic ring; l and n each are 0 or an integer of 1 to 6; and m is 0 or an integer of 1 to 3.

Ar represents a divalent aromatic carbon ring residue or a divalent aromatic heterocyclic residue or a substituted group thereof.

k is an integer of 1 to 7.

q is 0 or an integer of 1 or 2.

$Z^\ominus$ represents an anion residue.

DETAILED DESCRIPTION OF THE INVENTION

The bisazulenium salt compounds of the present invention will be explained in detail.

When $R^1$ is an unsubstituted alkyl group, it is, for example, a methyl group, an ethyl group, a propyl group, a butyl group, a pentyl group, a hexyl group, an octyl group, a nonyl group, a dodecyl group, an isopropyl group, an isobutyl group, an isopentyl group, a 4-methylpentyl group, a sec-butyl group or a tert-butyl group. When $R^1$ is a substituted alkyl group, examples of the substituents on the alkyl group are a halogen atom (such as a chlorine atom, a bromine atom or a fluorine atom), an alkoxy group (such as a methoxy group, an ethoxy group, a propoxy group, a butoxy group or a pentyloxy group), an aryloxy group (such as a phenoxy group, an o-tolyloxy group, an m-tolyloxy group, a p-tolyloxy group, a 1-naphthyloxy group or a 2-naphthyloxy group), a dialkylamino group (such as a dimethylamino group, a diethylamino group, a dipropylamino group, an N-methyl-N-ethylamino group, an N-ethyl-N-propylamino group or an N-methyl-N-propylamino group), a diarylamino group (such as a diphenylamino group), an alkylthio group (such as a methylthio group, an ethylthio group or a propylthio group) and an N-containing heterocyclic group (such as a piperidino group, a 1-piperazyno group, a morpholino group or a 1-pyrrolidyl group). The substituted alkyl group has at least one of these substituents on at least one carbon atom of the alkyl group as exemplified above.

When $R^1$ represents an unsubstituted aralkyl group, it is, for example, a benzyl group, a phenethyl group, a 1-naphthylmethyl group, a 2-naphthylmethyl group, a 1-anthrylmethyl group or benzhydryl group. When $R^1$ represents a substituted aralkyl group, examples of the substituents thereon are the same as those of the substituted alkyl group as above-mentioned. The substituted aralkyl group has at least one of the substituents on at least one carbon atom of the aralkyl group as previously exemplified.

When $R^1$ represents as unsubstituted aryl group, it is, for example, a phenyl group, a 1-naphthyl group, a 2-naphthyl group, an anthryl group, a pyrenyl group, an acenaphthenyl group or fluorenyl group. When $R^1$ represents a substituted aryl group, examples of the substituents thereon are the same as those of the substituted alkyl group as above-mentioned. In addition, the substituent may be an alkyl group such as a methyl group, an ethyl group, a propyl group, a butyl group, a pentyl group, an isopropyl group, an isobutyl group or an isopentyl group. The substituted aryl group has at least one of the substituents on at least one carbon atom of the aryl group as previously exemplified.

When two $R^1$s in the general formula (1) is bonded to each other to form a nitrogen atom containing heterocyclic group, it is, for example, a piperazine group.

When $R^1$ in the general formula (2) represents a halogen atom, it is, for example, a fluorine atom, a chlorine atom or a bromine atom.

When $R^2$ or $R^3$ represents a halogen atom, it is, for example, a fluorine atom, a chlorine atom or a bromine atom.

When $R^2$, $R^3$ or $R^4$ represents an alkyl group, an aryl group or an aralkyl group or a substituted group thereof, the same examples of the aforesaid $R^1$, representing the alkyl, aryl or aralkyl group or the substituted group thereof, may be applied thereto.

When $R^5$, $R^6$, $R^7$, $R^8$, $R^9$, $R^{10}$ or $R^{11}$ represents a halogen atom, it is, for example, a fluorine atom, a chlorine atom or a bromine atom. When $R^5$, $R^6$, $R^7$, $R^8$, $R^9$, $R^{10}$ or $R^{11}$ represents an alkyl group, an aryl group or an aralkyl group or a substituted group thereof, the same examples of the aforesaid $R^1$, representing the alkyl, aryl or aralkyl group or the substituted group thereof, may be applied thereto. When $R^5$, $R^6$, $R^7$, $R^8$, $R^9$, $R^{10}$ or $R^{11}$ represents an unsubstituted alkoxy group or aryloxy group, it is, for example, an alkoxy group such as a methoxy group, an ethoxy group or a propoxy group, or an aryloxy group such as phenoxy group or a naphthoxy group. When $R^5$, $R^6$, $R^7$, $R^8$, $R^9$, $R^{10}$ or $R^{11}$ represents a substituted alkoxy group or an aryloxy group, examples of the substituents thereon are the same as those of the substituted alkyl group of $R^1$ as above mentioned. In addition, the substituent may be an alkyl group such as a methyl group, an ethyl group or an isopropyl group. When $R^5$, $R^6$, $R^7$, $R^8$, $R^9$, $R^{10}$ or $R^{11}$ represents an unsubstituted acyl group, it is, for example, an acetyl group, a benzoyl group or a naphthoyl group. When $R^5$, $R^6$, $R^7$, $R^8$, $R^9$, $R^{10}$ or $R^{11}$ represents a substituted acyl group, a carbamoyl group or an amino group, examples of the substituents thereon are the same as those of the substituted alkyl group of $R^1$ as above-mentioned. In addition, the substituent may be an alkyl group such as a methyl group, an ethyl group or an isopropyl group. When $R^5$, $R^6$, $R^7$, $R^8$, $R^9$, $R^{10}$ or $R^{11}$ represents an alkali-metal-carboxylato group or an alkali metal-sulfonato group, examples of the alkali metal (cation) are $Na\oplus$, $K\oplus$, and $Li\oplus$.

When the combination of $R^5$ and $R^6$, $R^7$ and $R^8$, $R^8$ and $R^9$, $R^9$ and $R^{10}$ or $R^{10}$ and $R^{11}$ forms an unsubstituted aromatic ring, it is, for example, a benzene ring, a naphthalene ring, a pyridine ring, a thiophene ring, an azulene ring, a tropone ring, a thiazole ring or an oxazole ring. When the combination of $R^5$ and $R^6$, $R^7$ and $R^8$, $R^8$ and $R^9$, $R^9$ and $R^{10}$ or $R^{10}$ and $R^{11}$ forms a substituted aromatic ring, examples of the substituents thereon are the same as those of the substituted alkyl group of $R^1$ as above-mentioned. In addition, the substituent may be an alkyl group such as a methyl group, an ethyl group or an isopropyl group.

Examples of $R^{12}$ and $R^{13}$ are the same as those of the aforesaid $R^5$, $R^6$, $R^7$, $R^8$, $R^9$, $R^{10}$ or $R^{11}$. When $R^{12}$ and $R^{13}$ are bonded to form a condensed polycyclic aromatic ring, it is, for example, a naphthalene ring or an anthracene ring.

Ar represents a divalent aromatic carbon ring residue or a divalent aromatic heterocyclic residue or a substituted group thereof. Examples of these groups are divalent aromatic carbon ring residues or divalent aromatic heterocyclic residues as represented by the following structural formulae or substituted groups thereof:

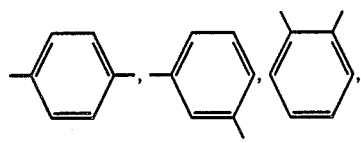

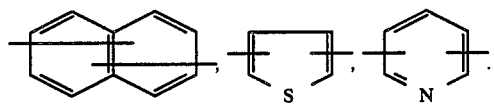

Examples of the substituents on these groups are the same as those of the substituted alkyl group of $R^1$ as above-mentioned. In addition, the substituent may be an alkyl group such as a methyl group, an ethyl group or an isopropyl group.

The number of the substituents on Ar may be 1 to 6, and these substituents may be same or different.

$Z^\ominus$ represents an anion residue, and examples thereof are perchlorate, fluoroborate, iodide, chloride, bromide, sulfate, periodide and p-toluenesulfonate. The number and the kinds of the substituents on each carbazole ring in the general formula (2) may be the same or different.

In the general formula (2), $R^1$ may be introduced into any substituent position of the carbazole ring, and the number of the substituents on each carbazole ring is 1 to 7.

The bisazulenium compounds of the present invention may be obtained by blending a biscarbonyl compound of the following general formula (4) or (5) and an azulene compound in an appropriate solvent and in the presence of a strong acid.

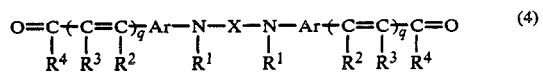

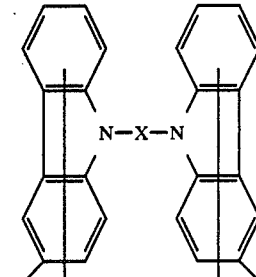

In the formulae (4) and (5), $R^1$, $R^2$, $R^3$, $R^4$, X, Ar, k and q have the same meanings as above.

Usable reaction solvents are alcohols such as ethanol, butanol and benzyl alcohol, nitriles such as acetonitrile and propionitrile, organic carboxylic acids such as acetic acid, acid anhydrides such as acetic anhydride, and alicyclic ethers such as dioxane and tetrahydrofuran. An aromatic hydrocarbon such as benzene may be incorporated into butanol or benzyl alcohol. The reaction temperature is selected from the range of $-20°$ C. to the boiling point.

Usable strong acids are sulfuric acid, hydrochloric acid, hydrobromic acid, hydroiodic acid, perchloric acid, periodic acid, p-toluenesulfonic acid, and borofluoric acid.

The biscarbonyl compounds of the above formulae (4) and (5) may be obtained in accordance with the direction as given in *J. Chem. Soc.*, (C) (1966), 666, written by P. W. Hickmott.

Examples of the bisazulenium salt compounds of the present invention as represented by the aforesaid formula (1) or (2) are given below, which, however, are not whatsoever limitative.

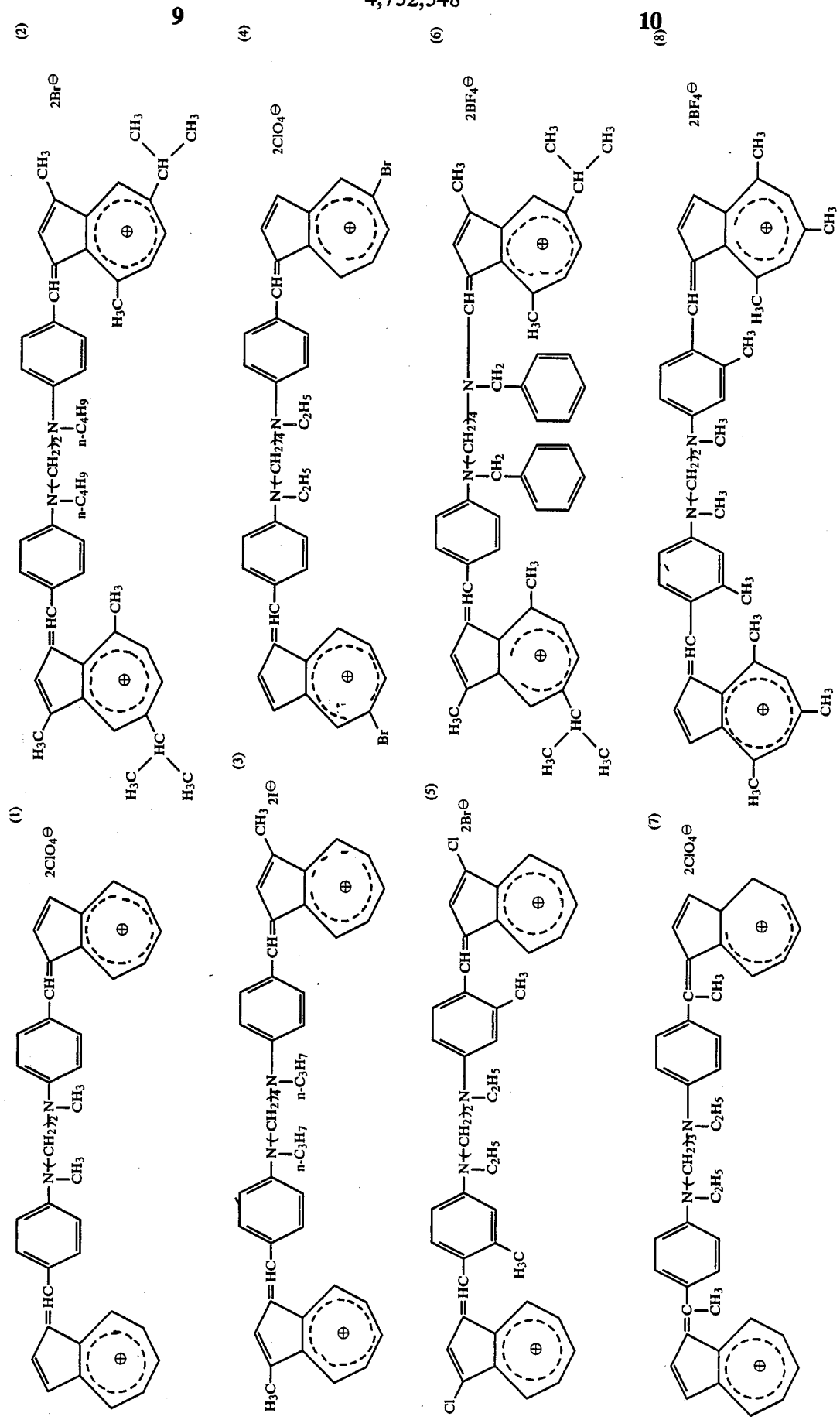

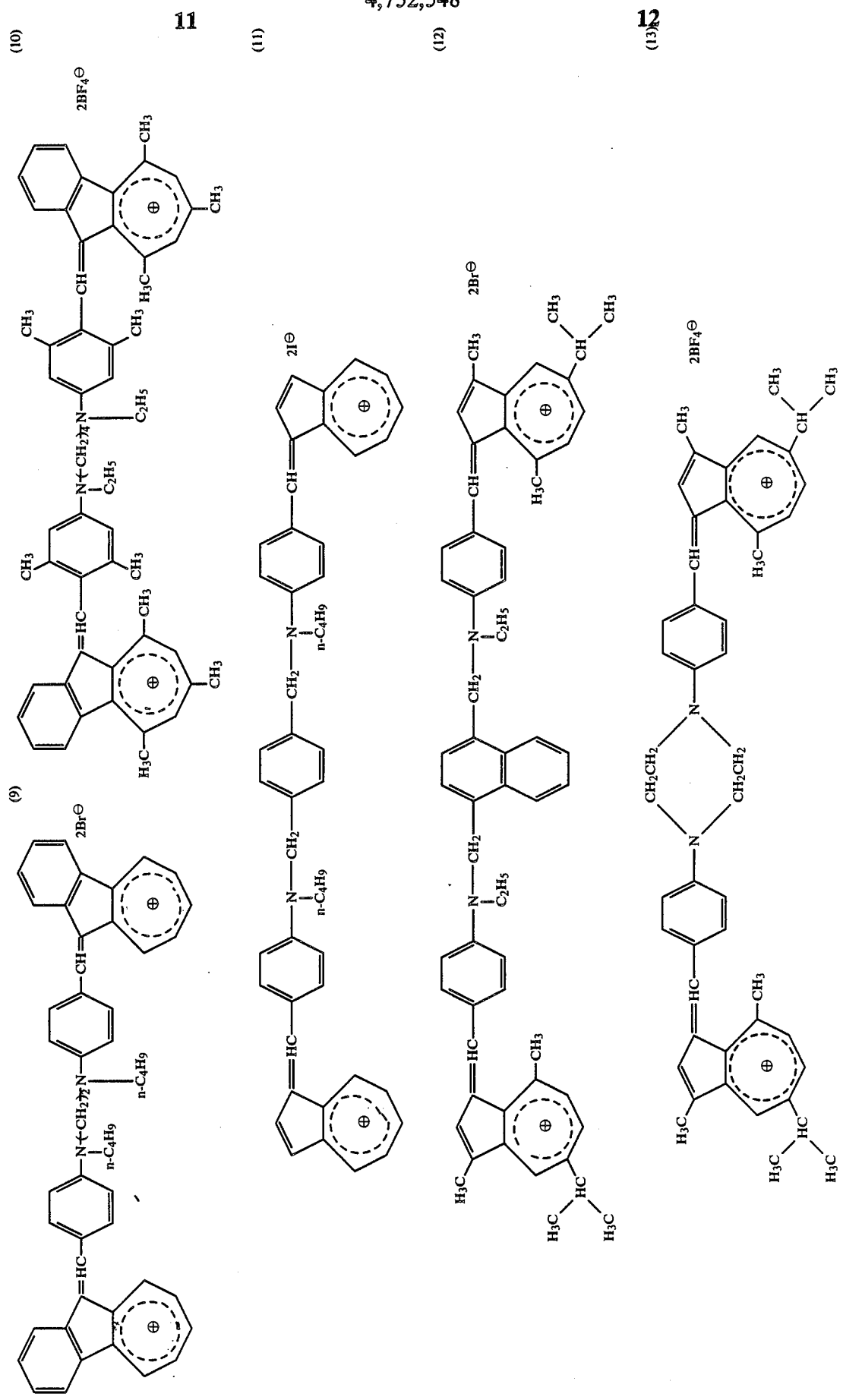

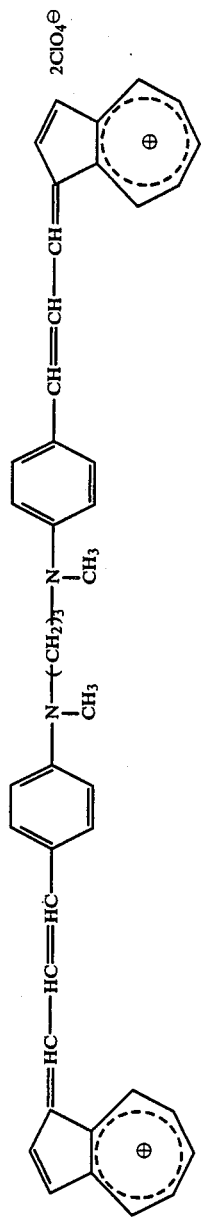
(14)
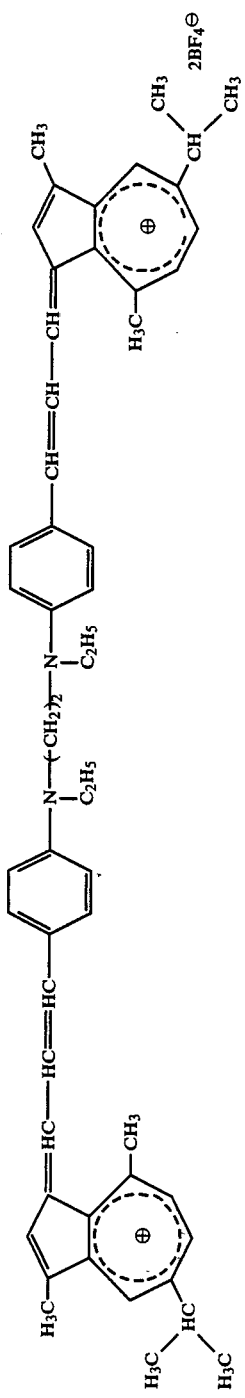
(15)
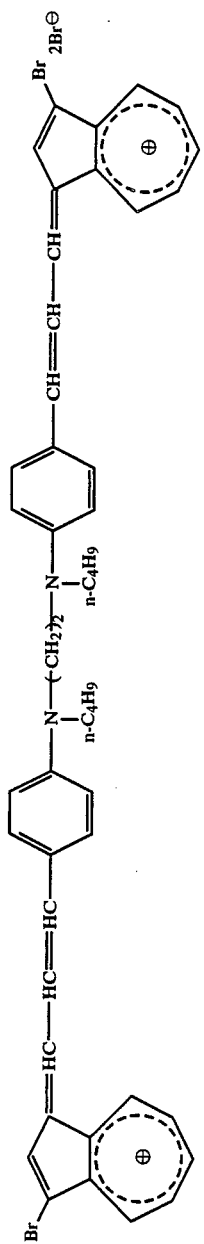
(16)
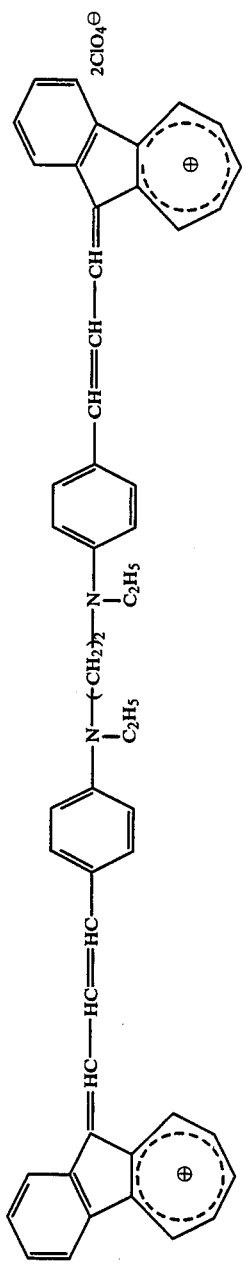
(17)

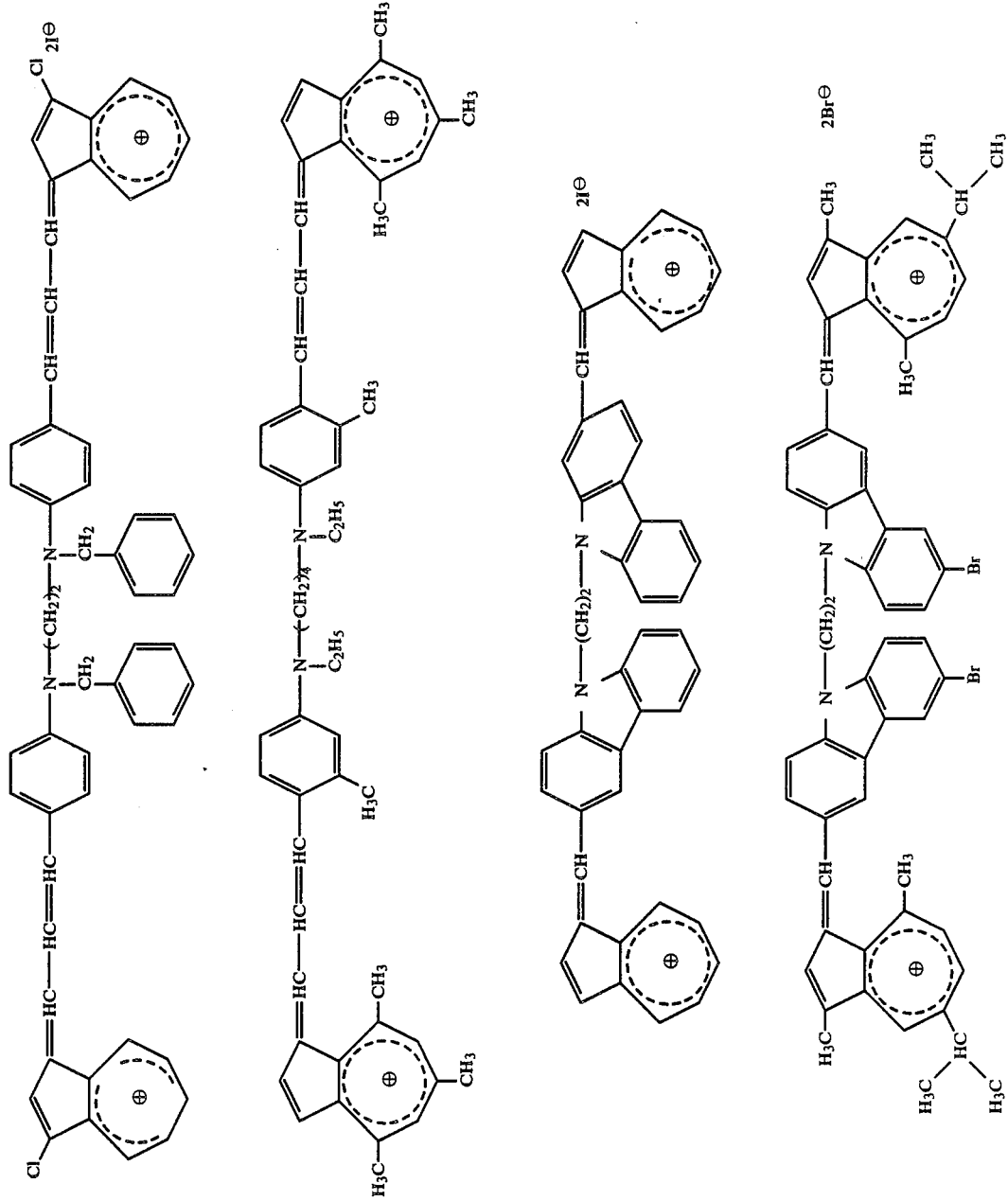

-continued
(22) 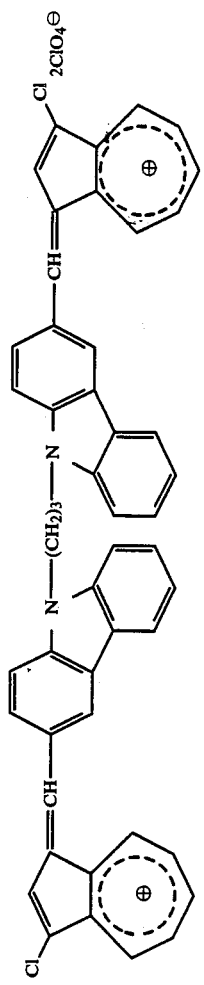
(23) 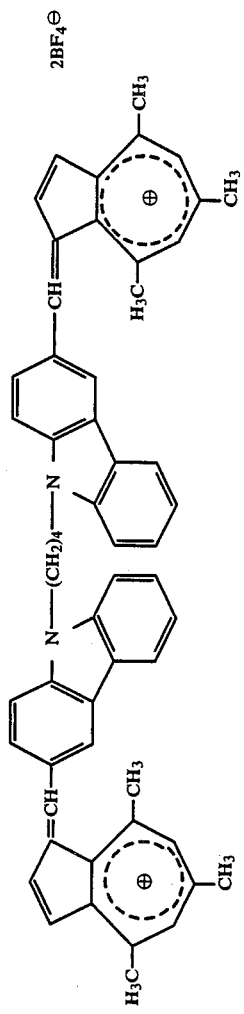
(24) 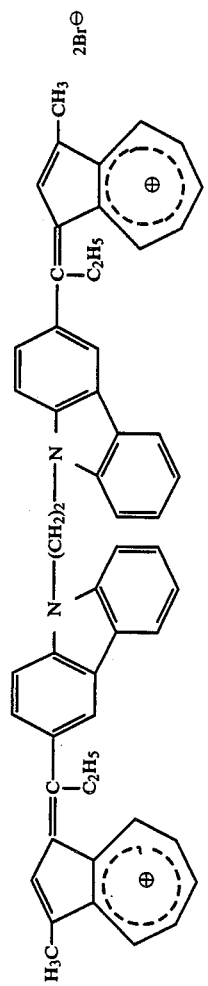
(25) 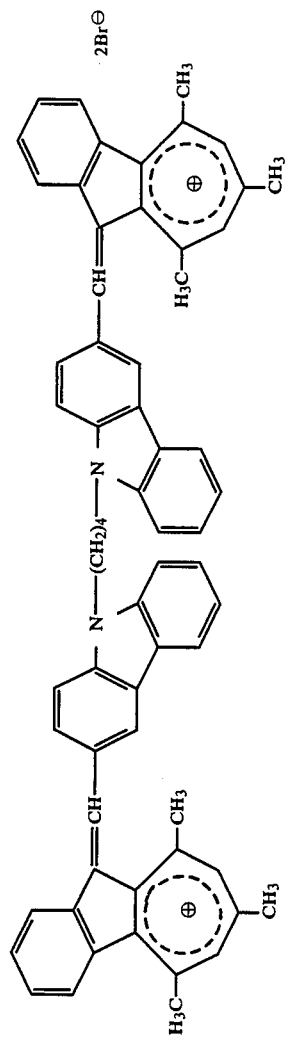

-continued
(26) 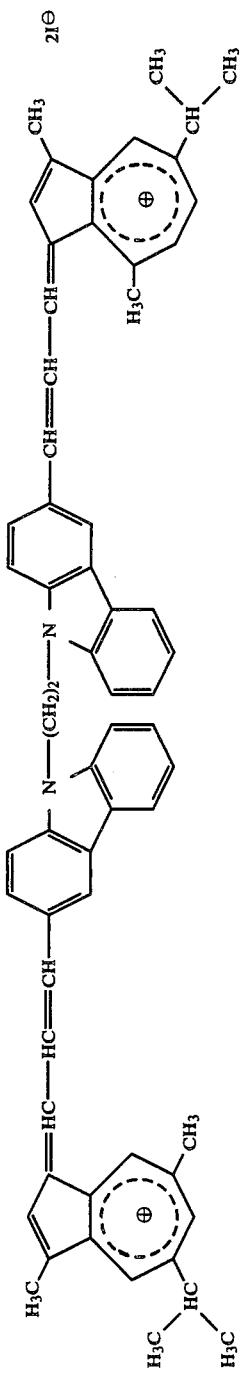
(27) 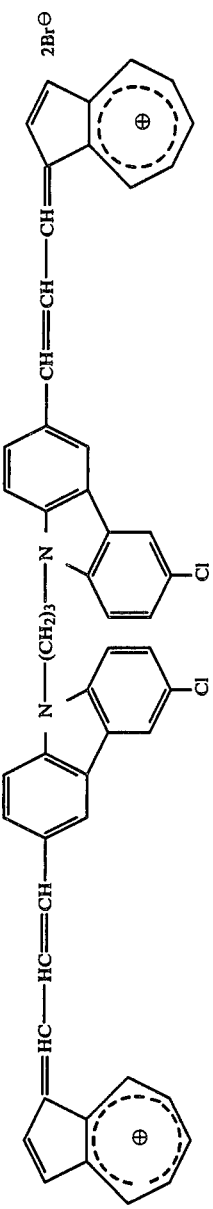
(28) 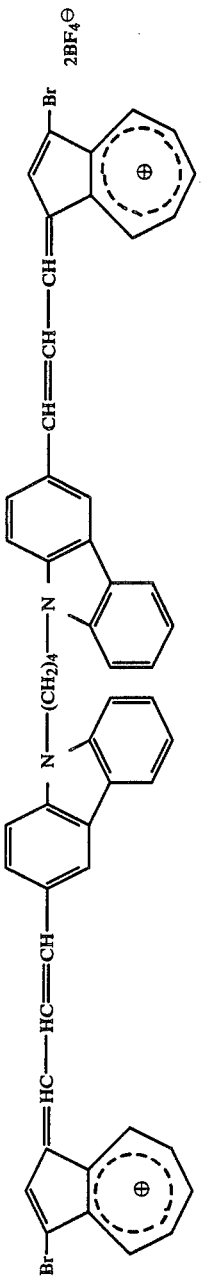
(29) 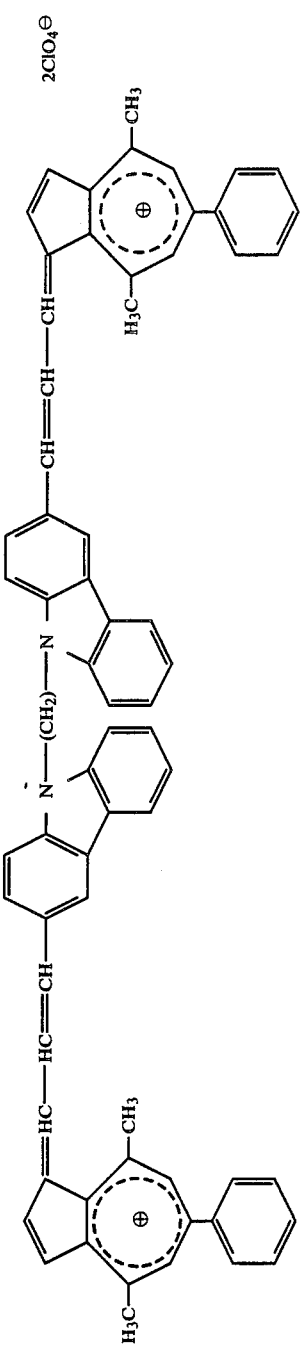

-continued
(30)
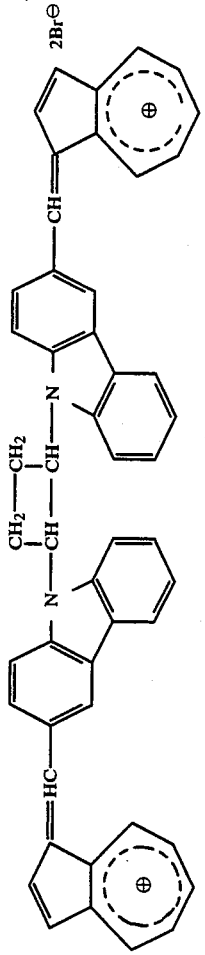
(31)
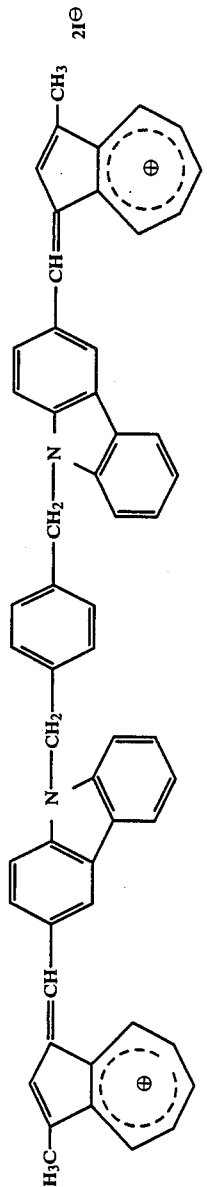
(32)
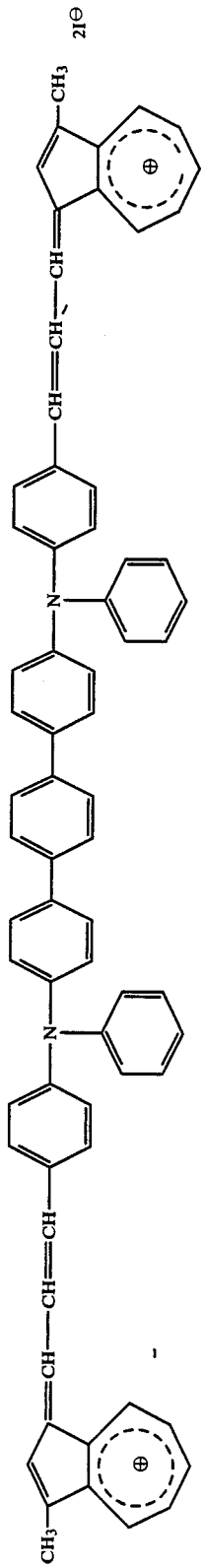

The electrophotographic photoreceptors of the present invention have an electrophotographic light-sensitive layer containing one or more bisazulenium salt compounds of the aforesaid formula (1) or (2). Various types of electrophotographic photoreceptors are known, and the photoreceptors of the present invention may be any type of the known photoreceptors and, in general, comprise an electrophotographic photoreceptor structure of the type as mentioned below.

(a) An electrophotographic light-sensitive layer formed by dispersing the bisazulenium salt compound in a binder or in a charge carrier-transporting medium is provided on an electroconductive support.

(b) A charge carrier-generating layer comprising the bisazulenium salt compound is provided on an electroconductive support and a charge carrier-transporting medium layer is superposed thereon.

The bisazulenium salt compound of the present invention acts as a photoconductive substance, and when it absorbs light, it generates a charge carrier with extremely high efficiency. The generated charge carrier is transported through the bisazulenium salt compound, and it is more effective if the carrier is transported through a medium of a charge carrier-transporting compound.

For the formation of the electrophotographic photoreceptor of the type (a), fine particles of the bisazulenium salt compound are dispersed in a binder solution or in a solution comprising a charge carrier-transporting compound and a binder, and the resulting dispersion is coated on an electroconductive support and then dried. The thickness of the electrophotographic light-sensitive layer is 3 to 20 μm, preferably 5 to 20 μm.

For the formation of the electrophotographic photoreceptor of the type (b), the bisazulenium salt compound is coated on an electroconductive support by vacuum evaporation, or fine particles of the bisazulenium salt compound are dispersed in an appropriate solvent or, if necessary, in a solvent containing a binder which is dissolved therein and the resulting dispersion is coated and dried on a support and, then, a solution containing a charge carrier-transporting compound and a binder is coated and dried on the previously coated layer. In the photoreceptor of the type (b), the thickness of the bisazulenium salt compound layer, which is a charge carrier-generating layer, is 4 to 0.01 μm, preferably 2 to 0.01 μm, and the thickness of the charge carrier-transporting medium layer is 3 to 30 μm, preferably 5 to 20 μm.

The bisazulenium salt compound to be used in the photoreceptors of the types (a) and (b) is milled in a mill such as a ball mill, sand mill or shaking mill to form fine particles having a particle size of 5 μm or less, preferably 2 μm or less.

Regarding the amount of the bisazulenium salt compound to be used in the electrophotographic photoreceptor of the type (a), if the amount is too small, the sensitivity is bad, but, on the contrary, if the amount is too large, the electric charge worsens and the strength of the electrophotographic light-sensitive layer becomes weak. Therefore, the ratio of the bisazulenium salt compound to be incorporated in the light-sensitive layer is 0.01 to 2 times by weight, preferably, 0.05 to 1 time by weight, of the binder. The ratio of the charge carrier-transporting compound, which is optionally added, is 0.1 to 2 times by weight, preferably 0.3 to 1.3 times by weight, of the binder. In the case where a charge carrier-transporting compound which per se acts as a binder is used, the amount of the bisazulenium salt compound to be added is preferably 0.01 to 2 times by weight of the binder (i.e., the charge carrier-transporting compound).

In an electrophotographic photoreceptor of the type (b), in the case where the bisazulenium salt compound-containing layer is coated and formed with the use of a binder, which layer is the charge carrier-generating layer in the electrophotographic photoreceptor of the type (b), the amount of the bisazulenium salt compound to be used is preferably 0.1 to 20 times by weight of the binder resin in the charge carrier-generating layer. If the amount is less than that, a sufficient light sensitivity cannot be attained. In the type (b) photoreceptor, the ratio of the charge carrier-transporting compound in the charge carrier-transporting medium is 0.2 to 2 times by weight, preferably 0.2 to 1.3 times by weight, of the binder in the charge carrier-transporting medium layer.

In the case where a charge carrier-transporting high molecular compound which per se may act as a binder is used for the formation of the electrophotographic photoreceptors of both types (a) and (b), it may be unnecessary to use any other binder. When the other binder is used in combination with the charge carrier-transporting high molecular compound which per se acts as a binder, the amount of the other binder to be used is preferably 0.01 to 10 times by weight of the charge carrier-transporting compound.

In the photoreceptor of the type (b), a charge carrier-transporting compound such as a hydrazone compound or an oxime compound may be added to the charge carrier generating layer as described in Japanese Patent Application (OPI) Nos. 196767/85, 254045/85 and 262159/85.

The binders to be used are preferably those of a film-forming high molecular polymer of high dielectric constant and electric insulation. Examples of the high molecular polymers are given below, which, of course, are not limitative.

Polycarbonates, polyesters, polyester carbonates, methacrylic resins, acrylic resins, polyvinyl chlorides, polyvinylidene chlorides, polystyrenes, polyvinyl acetates, styrene-butadiene copolymers, vinylidene chlorideacrylonitrile copolymers, vinyl chloride-vinyl acetate copolymers, vinyl chloride-vinyl acetate-maleic anhydride copolymers, silicone resins, silicone-alkyd resins, phenolformaldehyde resins, styrene-alkyd resins, poly-N-vinylcarbazoles.

These binders may be used singly or in the form of a mixture of two or more of them.

In the formation of the electrophotographic photoreceptor in accordance with the present invention, additives such as a plasticizer or a sensitizer may be added together with the binder.

Usable plasticizers are biphenyl, biphenyl chloride, o-terphenyl, p-terphenyl, dibutyl phthalate, dimethylglycol phthalate, dioctyl phthalate, triphenyl phosphate, methyl napthalene, benzophenone, chlorinated paraffin, polypropylene, polystyrene, dilauryl thiodipropionate, 3,5-dinitrosalicylic acid and various kinds of fluorohydrocarbons.

Further, a silicone oil may be added in order to improve the surface property of the electrophotographic photoreceptors.

Usable sensitizers are chloranyl, tetracyanoethylene, methyl violet, rhodamine B, cyanine dyes, merocyanine dyes, pyrylium dyes and thiapyrylium dyes.

The charge carrier-transporting compounds are generally classified into two groups of electron-transporting compounds and positive hole-transporting compounds, and both may be used in the electrophotographic photoreceptors of the present invention. The electron-transporting compounds are those having an electron-attractive group, and examples thereof are 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole-chloranyl, 2,3-dichloro-5,6-dicyanobenzoquinone, 2,4,7-trinitro-9,10-phenanthrenequinone, tetrachlorophthalic anhydride, tetracyanoethylene and tetracyanoquinodimethane.

The positive hole-transporting compounds are those having an electron-donative group and include high molecular compounds and low molecular compounds. Examples of the high molecular compounds are as follows:

(1) Polyvinylcarbazoles and derivatives thereof, as described in Japanese Patent Publication No. 10966/59.
(2) Vinyl polymers such as polyvinyl pyrene, polyvinyl anthracene, poly-2-vinyl-4-(4'-dimethylaminophenyl)-5-phenyloxazole and poly-3-vinyl-N-ethylcarbazole, as described in Japanese Patent Publication Nos. 18674/68 and 19192/68.
(3) Polymers such as polyacenaphthylene, polyindene and copolymers of acenaphthylene and styrene, as described in Japanese Patent Publication No. 19193/68.
(4) Condensed resins such as pyrene-formaldehyde resins, bromopyrene-formaldehyde resins and ethylcarbazoleformaldehyde resins, as described in Japanese Patent Publication No. 13940/81.
(5) Various kinds of triphenylmethane polymers, as described in Japanese Patent Application (OPI) Nos. 90883/81 and 161550/81.

Examples of the low molecular compounds are as follows:

(6) Triazole derivatives as described in U.S. Pat. No. 3,112,197.
(7) Oxadiazole derivatives as described in U.S. Pat. No. 3,189,447.
(8) Imidazole derivatives as described in Japanese Patent Publication No. 16096/62.
(9) Polyarylalkane derivatives as described in U.S. Pat. Nos. 3,615,402, 3,820,989 and 3,542,544, Japanese Patent Publication Nos. 555/70 and 10983/76, and Japanese Patent Application (OPI) Nos. 93224/76, 108667/80, 156953/80 and 36656/81.
(10) Pyrazoline derivatives and pyrazolone derivatives as described in U.S. Pat. Nos. 3,180,729 and 4,278,746, and Japanese Patent Application (OPI) Nos. 88064/80, 88065/80, 105537/74, 51086/80, 80051/81, 88141/81, 45545/82, 112637/79 and 74546/80.
(11) Phenylenediamine derivatives as described in U.S. Pat. No. 3,615,404, Japanese Patent Publication No. 10105/76 and Japanese Patent Application (OPI) Nos. 83435/79, 110836/79, 119925/79 and Japanese Patent Publication Nos. 3712/71 and 28336/72.
(12) Arylamine derivatives as described in U.S. Pat. No. 3,567,450, Japanese Patent Publication No. 35702/74, German Patent DAS No. 1,110,518, U.S. Pat. Nos. 3,180,703, 3,240,597, 3,658,520, 4,232,103, 4,175,961, 4,012,376, Japanese Patent Application (OPI) Nos. 144250/80 and 119132/81, Japanese Patent Publication No. 27577/64 and Japanese Patent Application (OPI) No. 22437/81.
(13) Amino-substituted chalcone derivatives as described in U.S. Pat. No. 3,526,501.
(14) N,N-bicarbazyl derivatives as described in U.S. Pat. No. 3,526,501.
(15) Oxazole derivatives as described in U.S. Pat. No. 3,257,203.
(16) Styrylanthracene derivatives as described in Japanese Patent Application (OPI) No. 46234/81.
(17) Fluorenone derivatives as described in Japanese Patent Application (OPI) No. 110837/79.
(18) Hydrazone derivatives as described in U.S. Pat. No. 3,717,462, Japanese Patent Application (OPI) No. 59143/79 (corresponding to U.S. Pat. No. 4,150,987), Japanese Patent Application (OPI) Nos. 52063/80, 52064/80, 46760/80, 85495/80, 11350/82, 148749/82 and 104144/82.
(19) Benzidine derivatives as described in U.S. Pat. Nos. 4,047,948, 4,047,949, 4,265,990, 4,273,846, 4,299,897 and 4,306,008.
(20) Stilbene derivatives as described in Japanese Patent Application (OPI) Nos. 190953/83, 95540/84, 97148/84 and 195658/84.

The charge carrier-transporting compounds which may be used in the present invention are not limited only to the compounds of the aforesaid groups (1) through (20), but any and every known charge carrier-transporting compound may be used in the present invention.

These charge carrier-transporting materials may be used, as the case may be, in the form of a mixture of two or more of them.

The electroconductive supports which may be used for the formation of the electrophotographic photoreceptors of the present invention are metal plates such as aluminum, copper or zinc plate; plastic sheets or films such as polyester, which are coated with an electroconductive material such as aluminum, indium oxide or $SnO_2$ by evaporation plating or by dispersion spraying; and electroconductivity-imparted papers. In the photoreceptors formed as described above, an adhesive layer or a barrier layer may optionally be provided between the electroconductive support and the light-sensitive layer, if necessary. Materials which may be used in the adhesive or barrier layer are the high polymers as mentioned for the binder above, and additionally, gelatin, casein, polyvinyl alcohol, ethyl cellulose and carboxymethyl cellulose as well as vinylidene chloride type polymer latex as described in Japanese Patent Application (OPI) No. 84247/84, styrene-butadiene type polymer latex as described in Japanese Patent Application (OPI) No. 114544/84 and aluminum oxide. The thickness of the layer is preferably 1 μm or less.

The electrophotographic photoreceptors of the present invention are explained in detail above, and are generally characterized by high sensitivity and high durability.

The electrophotographic photoreceptors of the present invention may be used in electrophotographic duplicators and further may widely be used in other various fields, for example, as photoreceptors in printers using a light source of laser or Braun tube.

The light-sensitive compositions containing the bisazulenium salt compound of the present invention may be used as the photoconductive layer of a television camera tube of a video camera or as the photoconductive layer of a solid state image pickup element which has a photoreceptor layer (photoconductive layer) which is provided over the entire surface of a semiconductor circuit of a primary or secondary configuration for signal transmission or scanning. In addition, they may be used as the photoconductive layer of a solar battery as described in A. K. Ghosh, Tom Feng, J. Appl. Phys., 49 (12), 5982 (1978).

Further, the bisazulenium salt compounds of the present invention may be used as photoconductive color particles in a photoelectrophoresis system or as color particles in a dry type or wet type electrophotographic developer.

The bisazulenium salt compounds of the present invention may be used for the formation of printing plates in accordance with the means as described in Japanese Patent Publication No. 17162/62 and Japanese Patent Application (OPI) Nos. 19063/80, 161250/80 and 147656/82. More precisely, the present bisazulenium salt compound can be dispersed in a solution of an alkali-soluble resin, such as a phenol resin, together with the aforesaid charge carrier-transporting compound, such as an oxadiazole derivative or hydrazone derivative, the resulting dispersion can be coated and dried on an electroconductive support such as aluminum, and then, the coated support can be subjected to image exposure, toner development and etching with an alkali aqueous solution, whereby a printing plate of high resolving power, high durability and high sensitivity may be obtained. In the same manner, printed circuits may be obtained by the use of the present bisazulenium salt compounds.

Next, one embodiment of the present invention will be described below, where the light-sensitive composition of the present invention is used as an optical information-recording medium.

The optical information-recording medium of the present invention comprises an organic thin film at least containing the bisazulenium salt compound of the present invention and a binder, which is provided on a support. The organic thin film is formed on the support by coating the aforesaid compounds thereover by vacuum evaporation plating or by other coating means.

In the coating of the thin film, an organic solvent can be used. Usable organic solvents are alcohols (such as methanol, ethanol, isopropanol), ketones (such as acetone, methyl ethyl ketone, methyl isobutyl ketone, cyclohexanone), amides (such as N,N-dimethylformamide, N,N-dimethylacetamide), esters (such as methyl acetate, ethyl acetate, butyl acetate), ethers (such as tetrahydrofuran, dioxane), halogenated hydrocarbons (such as methylene chloride, chloroform, methylchloroform, carbon tetrachloride, monochlorobenzene, dichlorobenzene). These may be used singly or in the form of a mixture thereof. The binder for the bisazulenium salt compound as dyes may be selected from known natural or synthetic resins, for example, including cellulose resins (such as nitrocellulose, cellulose phosphate, cellulose acetate, cellulose butyrate, methyl cellulose, ethyl cellulose, butyl cellulose), acrylic resins (such as polymethyl methacrylate, polybutyl methacrylate, polybutyl acrylate, polymethacrylic acid, polyacrylamide, polymethacrylamide, polyacrylonitrile), vinyl resins (such as polystyrene, polyvinyl acetate, polyvinyl chloride, polyvinyl alcohol, polyvinyl pyrrolidone), polycarbonates, polyesters, polyamide resins, epoxy resins, phenol resins, polyolefin resins (such as polyethylene, polypropylene) and synthetic copolymer resins. The coating may be carried out in a conventional manner, for example, by spraying, roller coating, spinner coating or blade coating.

In the formation of the organic thin film together with the resin binder, the content of the bisazulenium salt compound is 5 to 90% by weight, preferably 15 to 80% by weight, in the film, and the remainder is the binder. The evaporation-plated film thickness or the dry film thickness of the organic thin layer is 10 to 0.1 $\mu$m, preferably 2 to 0.1 $\mu$m.

If necessary, the organic thin film may contain a discoloration inhibitor or a coloring agent.

The materials of the support to be used in the recording medium of the present invention are known in this technical field, and these may be either transparent or opaque to the laser ray to be used. For example, glass, quartz, ceramics, paper, metals, plastics (such as acrylic resins, methacrylic resins, polyester resins, polyolefin resins, polystyrene resins, polyamide resins, polycarbonate resins), etc., may be used.

In the case where the writing and recording is to be carried out by the irradiation of a laser ray from the side of the support, the support must be transparent to the laser ray, but on the contrary, if the writing and recording is to be carried out from the opposite side of the support, or that is, from the side of the surface of the recording layer, the support does not necessarily have to be transparent to the laser ray. However, in the case where the reading and reproduction is to be carried out with a transmitted light, the support must necessarily be transparent to the reading laser ray. In the case, on the contrary, where the reading and reproduction is to be carried out with a reflected light, the support may be either transparent or opaque to the reading laser ray. The support may optionally be provided with guide grooves to form a rugged surface, or if necessary, it may be provided with a subbing layer comprising, for example, an ultraviolet-hardening resin.

The optical information-recording media of the present invention fundamentally comprise the organic thin film which is provided on the aforesaid support, and, if necessary, a reflective layer of a reflective metal such as aluminum, silver, chromium or tin formed by evaporation plating or lamination, can be provided between the support and the organic thin film.

The information recording is carried out by the irradiation of a laser ray which is focused on the organic thin film to form pits thereon by the thermal energy of the focused ray. If the depth of the pits is made the same as the thickness of the organic thin film, the reflectivity in the portions of the film where the pits are located is increased. In the reproduction of the information, a laser ray having the same wavelength as, but a smaller strength than, that used in the writing is used, whereupon the reading-out light largely reflects in the portions of the film where the pits are located but is absorbed in the other portions of the film where there are no pits, and the difference of the amounts of the reflected light between the portions with pits and the portions with no pits is detected for the reproduction of the information. In the other possible means, the substantial recording is carried out with a laser ray of a first wavelength which is absorbed by the organic thin film, and another laser ray of a second wavelength which substantially penetrates the organic thin film is used for the reproduction. In the latter means, the reproducing laser ray responds to the variation of the reflective phase resulting from the difference of the film thickness between the portions with pits and the portions with no pits, whereby the information reproduction is carried out.

Two sheets of the recording media each having the same constitution as mentioned above may be so integrated that both organic thin films face each other to obtain a combined recording medium.

In the case of the combined recording medium, the organic thin film is shielded from the air and, therefore, may be protected from adhesion of dust particles, the occurrence of cracks and contact with harmful gas, and, accordingly, the preservation of the recording layer is extremely improved.

The laser rays applicable to the optical information recording media of the present invention are a gas laser such as an He-Ne laser or an He-Cd laser and a semiconductor laser having a wavelength of 750 nm or more.

The recording media containing the new light-sensitive composition of the present invention have high sensitivity and sufficiently improved S/N ratio to the laser with an absorption in the region of a wavelength of 750 nm or more.

The light-sensitive compositions of the present invention may be used as electrophotographic photoreceptors, electroconductive compositions and optical information-recording media as well as other recording materials with an infrared ray cut filter, a photosensor or a laser ray sensor.

The present invention will be explained in greater detail by reference to the following examples, which, however, are not intended to be interpreted as limiting the scope of the present invention. As used hereafter, "part" means "part by weight".

SYNTHESIS EXAMPLE

Synthesis of Compound (2)

A solution comprising 14 ml of hydrobromic acid and 100 ml of tetrahydrofuran was dropwise added to a mixture solution comprising 3.08 g (0.01 mol) of bis(N-n-butyl-4-formylanilino)butane (prepared in accordance with the method by P. W. Hickmott, J. Chem. Soc. (C), 1966, 666), 7.92 g (0.02 mol) of 1,4-dimethyl-7-isopropylazulene and 200 ml of tetrahydrofuran, at room temperature, and then the whole was stirred for 6 hours and thereafter left at room temperature for one night. The resulting precipitate was taken out by filtration and washed three times with 50 ml of tetrahydrofuran. Next, the precipitate was washed twice in 2 liters of water by ultrasonic washing and taken out by filtration and further washed twice with 50 ml of tetrahydrofuran.

The precipitate was washed with 200 ml of acetone, filtered and dried to obtain 4.21 g of Compound (2) as listed above. Yield: 50%.

The physical property of the compound was as follows:

m.p.: 300° C. or higher

Elementary Analysis ($C_{54}H_{66}Br_2$):

|  | C | H | Br |
|---|---|---|---|
| Calculated value (%): | 74.13 | 7.60 | 18.27 |
| Measured value (%): | 73.96 | 7.69 | 18.35 |

EXAMPLE 1

1 Part of the bisazulenium salt Compound (2) (as prepared in the Synthesis Example), 5 parts of 4,4'-bis(-diethylamino)-2,2'-dimethyltriphenylmethane and 5 parts of bisphenol A-polycarbonate (trade name: LEXAN 121 by GE) were added to 95 parts of dichloromethane and milled and blended in a ball mill to obtain a coating solution. The coating solution was coated on an electroconductive transparent support (which was formed by coating an indium oxide film on the surface of a polyethylene terephthalate film having a thickness of 100 μm by evaporation plating and which had a surface resistance of $10^3$ Ω) with a wire-round rod and dried to obtain an electrophotographic photoreceptor having a monolayer type electrophotographic light-sensitive layer with a thickness of about 8 μm.

The photoreceptor was tested with an electrostatic copying paper tester (SP-428 Type, by Kawaguchi Electric Co.), in which it was charged to +400 V with a corona discharge of +5 kV in a static system and the amount of the exposure necessary for attenuating the potential thereof to a half, that is, the half decay exposure amount $E_{50}$ (erg/cm$^2$), was measured. As the light source, there was used a gallium-aluminum-arsenic semiconductor laser (oscillation wavelength: 780 nm). The measured result was $E_{50}=32.7$ erg/cm$^2$.

EXAMPLES 2 to 7

The procedure of Example 1 was repeated, except that the bisazulenium salt compound as shown in the following Table 1 was used instead of Compound (2) as obtained in the Synthesis Example, to thereby manufacture various kinds of monolayer type electrophotographic photoreceptors. The half decay exposure amount $E_{50}$ of each sample under positive charge was measured in the same manner as in Example 1. The results are given in Table 1.

TABLE 1

| Example No. | Bisazulenium Salt Compound No. | $E_{50}$ (erg/cm$^2$) |
|---|---|---|
| 2 | (4) | 37.2 |
| 3 | (8) | 42.8 |
| 4 | (15) | 9.5 |
| 5 | (18) | 10.8 |
| 6 | (21) | 26.7 |
| 7 | (28) | 13.3 |

EXAMPLE 8

5 Parts of the bisazulenium salt Compound (2) (as prepared in the Synthesis Example) and a solution of 5 parts of polyester resin (trade name: VYLON 200, by Toyo Spinning Co.) which was dissolved in 50 parts of tetrahydrofuran were milled and dispersed in a ball mill for 20 hours to obtain a coating dispersion. The coating dispersion was coated on an electroconductive support (which was formed by coating an aluminum film on the surface of a polyethylene terephthalate film having a thickness of 75 μm by evaporation plating and which had a surface resistance of $4\times10^2$ Ω) with a wire-round rod and dried to obtain a charge-generating layer having a thickness of 0.5 μm.

Next, a solution obtained by dissolving 3.6 parts of p-(diphenylamino)benzaldehyde-N'-methyl-N'-phenyl-hydrazone (having the following structural formula) and 4 parts of bisphenol A-polycarbonate in 13.3 parts of dichloromethane and 26.6 parts of 1,2-dichloroethane was coated on the charge-generating layer with a wire-round rod and dried to form a charge-transporting layer having a thickness of 11 μm thereon to obtain an electrophotographic photoreceptor having a two-layer type (b) structure.

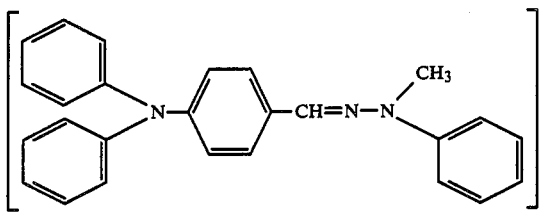

Using the electrostatic copying paper tester (SP-428 type, by Kawaguchi Electric Co.), the photoreceptor was charged for 2 seconds by corona discharge of −6 kV to measure the initial surface potential ($V_0$), and then this was discharged for 30 seconds in a dark place to measure the potential ($V_s$). Next, the photoreceptor was exposed with a light source of a gallium-aluminum-arsenic semiconductor laser (oscillation wave-length: 780 nm), whereupon the amount of the exposure required for attenuating the potential $V_s$ (as attained after the discharge for 30 seconds in the dark place) to the half thereof, that is, the half decay exposure amount $E_{50}$ (erg/cm$^2$), was measured. The results were as follows:

$V_0$: −920 V
$V_s$: −860 V
$E_{50}$: 25.4 erg/cm$^2$

The same measurement was repeated 3,000 times. The results showed that the variation of the aforesaid $V_0$, $V_s$ and $E_{50}$ was extremely small, and, therefore, the present photoreceptor was proved to have a good repeat characteristic.

EXAMPLES 9 to 21

The procedure of Example 8 was repeated, except that the bisazulenium salt compound as shown in the following Table 2 was used instead of Compound (2) as obtained in the Synthesis Example, to thereby manufacture various kinds of two-layer type (b) electrophotographic photoreceptors. The half decay exposure amount $E_{50}$ of each sample was measured in the same manner as in Example 8. The results are given in Table 2.

TABLE 2

| Example No. | Bisazulenium Salt Compound No. | $E_{50}$ (erg/cm$^2$) |
|---|---|---|
| 9 | (1) | 29.5 |
| 10 | (4) | 30.8 |
| 11 | (6) | 35.3 |
| 12 | (7) | 27.7 |
| 13 | (9) | 25.0 |
| 14 | (13) | 26.4 |
| 15 | (15) | 10.2 |
| 16 | (16) | 8.9 |
| 17 | (21) | 24.0 |
| 18 | (22) | 27.5 |

TABLE 2-continued

| Example No. | Bisazulenium Salt Compound No. | $E_{50}$ (erg/cm$^2$) |
|---|---|---|
| 19 | (23) | 41.2 |
| 20 | (26) | 9.6 |
| 21 | (29) | 13.4 |

The samples of Examples 9 through 21 were tested in the same manner as in Example 8 and the measurement was repeated 3,000 times in each sample. The results showed that the variation of $V_0$, $V_s$ and $E_{50}$ was small in every sample, and the stability was noted to be extremely high.

EXAMPLE 22

5 Parts of the bisazulenium salt Compound (2) (as prepared in the Synthesis Example), 40 parts of the hydrazone compound (as used in Example 8) and 100 parts of benzyl methacrylate/methacrylic acid copolymer ($[\eta]$=0.12 (30° C., methyl ethyl ketone), content of methacrylic acid: 32.9 mol%) were added to 660 parts of dichloromethane and dispersed by ultrasonic dispersion.

The resulting dispersion was coated on a sandblasted aluminum plate having a thickness of 0.25 mm and dried to obtain an electrophotographic light-sensitive printing plate material having an electrophotographic light-sensitive layer of a dry film thickness of 6 mm.

This sample was charged by corona discharge of +6 kV in a dark place, whereby the surface potential of the light-sensitive layer became about +600 V. Next, the sample was exposed with a gallium-aluminum-arsenic semiconductor laser (oscillation wavelength: 780 nm), and the half decay exposure amount was 35.7 erg/cm$^2$.

Next, the sample was charged in a dark place to have a surface potential of about +400 V, and then was closely positioned to a transmitting positive image original and imagewise exposed therethrough. As a light source, there was used a gallium-aluminum-arsenic semiconductor laser (oscillation wavelength: 780 nm). The sample was dipped in a liquid developer containing a toner which was prepared by adding 5 parts of polymethyl methacrylate (toner) and 0.01 part of soybean lecithin to 1,000 parts of Isopar H (petroleum type solvent, by Esso Standard Co.) in the form of a dispersion of fine particles to obtain a sharp positive toner image.

The sample was heated at 100° C. for 30 seconds to fix the toner image. The resulting printing plate material was dipped in a solution of 70 parts of sodium metasilicate hydrate which was dissolved in 140 parts of glycerin, 550 parts of ethylene glycol and 150 parts of ethanol, for about 1 minute, and then was washed with water by lightly brushing in a water stream to remove the part of the light-sensitive layer with no toner, to obtain a printing plate.

In an alternative embodiment, the electrostatic latent image as obtained in the sample was subjected to magnetic brush development with a toner for Xerox 3500 (by Fuji Xerox), instead of the development with the liquid developer, and then heated at 80° C. for 30 seconds for fixation. Next, the light-sensitive layer with no toner was removed with an alkali solution, whereby a printing plate was obtained.

Both printing plates thus manufactured were used for printing in a conventional manner with Hamada Star 600CD offset printer, whereby 50,000 sheets of prints of extremely high sharpness with no background stain were obtained.

EXAMPLE 23

10 g of nitrocellulose solution (25 wt% methyl ethyl ketone solution, by Daicel Ltd.), 3.0 g of the bisazulenium salt Compound (2) (as prepared in the Synthesis Example) and 100 g of tetrahydrofuran were blended and well dispersed. The resulting dispersion was coated on an acrylic resin base plate by spinner-coating (1,000 rpm) and dried at 80° C. for 2 hours to form a coated film thereon having a thickness of 0.3 μm. The recording medium thus manufactured was set on a turn table, and this was recorded by track-irradiation of a gallium-aluminum-arsenic semiconductor laser (oscillation wavelength: 780 nm) of 5 mW and 8 MHz onto the recording layer surface, while the turn table was rotated with a motor at 1,800 rpm, the spot size of the laser which was focused on the surface being 0.8 μm. The surface of the recorded layer was observed with a scanning electromicroscope, and there were sharp pits on the layer.

Next, a laser ray of a lowered output was irradiated onto the recording medium and the reflected light was detected. The results showed that a wave of sufficient S/N ratio was obtained.

While the invention has been described in detail and with reference to specific embodiments thereof, it will be apparent to one skilled in the art that various changes and modifications can be made therein without departing from the spirit and scope thereof.

What is claimed is:

1. A light-sensitive composition comprising a light sensitive layer on an electroconductive support, said light sensitive layer containing at least one bisazulenium salt compound of the general formulae (1) and (2):

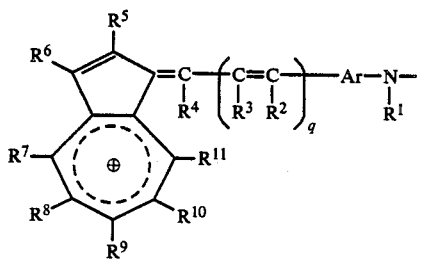

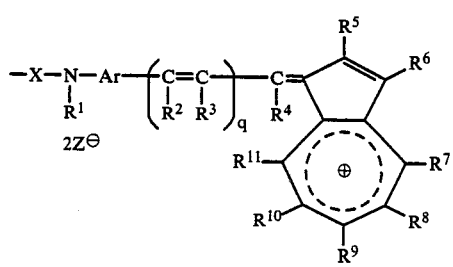

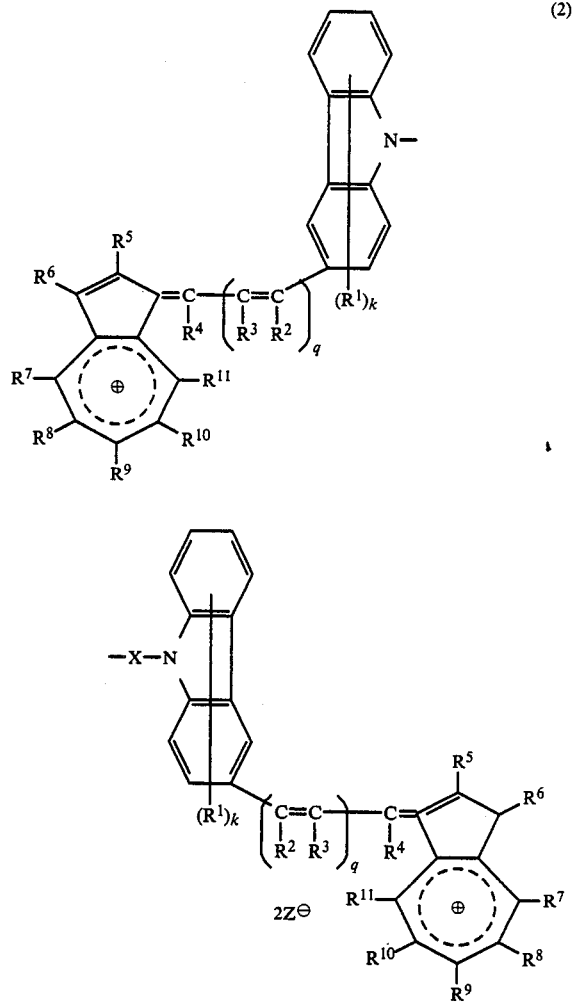

wherein $R^1$ represents an alkyl group, an aralkyl group or an aryl group or a substituted group thereof, two $R^1$s in the general formula (1) may be bonded to each other to form a nitrogen atom containing heterocyclic group, $R^1$ in the general formula (2) further represents a hydrogen atom or a halogen atom; $R^2$ and $R^3$ each represents a hydrogen atom, a halogen atom, an alkyl group, an aryl group or an aralkyl group or a substituted group thereof; $R^4$ represents a hydrogen atom, an alkyl group, an aryl group or an aralkyl group or a substituted group thereof; $R^5$, $R^6$, $R^7$, $R^8$, $R^9$, $R^{10}$ and $R^{11}$ each represents a hydrogen atom, a halogen atom, an alkyl group, an alkoxy group, an aryl group, an aryloxy group, an aralkyl group, an acyl group, a carboxyl group, an alkali metal-carboxylato group, a carbamoyl group, a sulfonic acid group, sulfamoyl group, an alkali metal-sulfonato group, a nitro group, a cyano group, an amino group or a hydroxyl group or a substituted group thereof, or at least one combination selected from the combinations of $R^5$ and $R^6$, $R^7$ and $R^8$, $R^8$ and $R^9$, $R^9$ and $R^{10}$ and $R^{10}$ and $R^{11}$ forms a substituted or unsubstituted aromatic ring; X represents an atomic group of the general formula (3):

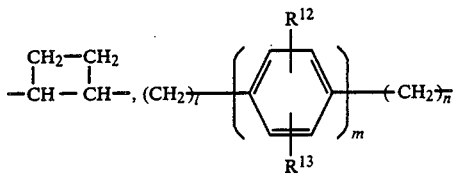

wherein $R^{12}$ and $R^{13}$ each represents a hydrogen atom, a halogen atom, an alkyl group, an alkoxy group, an aryl group or an aryloxy group or a substituted group thereof, $R^{12}$ and $R^{13}$ may be bonded to form a condensed polycyclic aromatic ring; l and n each is 0 or an integer of 1 to 6; m is 0 or an integer of 1 to 3; Ar represents a divalent aromatic carbon ring residue or a divalent aromatic heterocyclic residue or a substituted group thereof; k is an integer of 1 to 7; q is 0 or an integer of 1 or 2; and $Z^{\ominus}$ represents an anion residue.

2. An electrophotographic photoreceptor which has an electrophotographic light-sensitive layer containing one or more bisazulenium salt compounds of the general formulae (1) and (2) as claimed in claim 1.

3. The electrophotographic photoreceptor as claimed in claim 2, wherein the electrophotographic light-sensitive layer comprises the bisazulenium salt compound in a binder or in a charge carrier-transporting medium, and the layer is provided on an electroconductive support.

4. The electrophotographic photoreceptor as claimed in claim 2, wherein the electrophotographic light-sensitive layer is a charge carrier-generating layer comprising the bisazulenium salt compound, the charge carrier-generating layer is provided on an electroconductive support, and a charge carrier-transporting medium layer is superposed on the charge carrier-generating layer.

5. The electrophotographic photoreceptor as claimed in claim 3, wherein the bisazulenium salt compound is in a binder and is present in an amount of 0.01 to 2 times by weight of the binder.

6. The electrophotographic photoreceptor as claimed in claim 3, wherein the bisazulenium salt compound is in a charge carrier-transporting medium and is present in an amount of 0.01 to 2 times by weight of the charge carrier-transporting medium.

7. The electrophotographic photoreceptor as claimed in claim 5, wherein the electrophotographic light-sensitive layer contains a charge carrier-transporting compound which is present in an amount of 0.1 to 2 times by weight of the binder.

8. The electrophotographic photoreceptor as claimed in claim 4, wherein the charge carrier-generating layer contains a binder and the bisazulenium salt compound is present in an amount of 0.1 to 20 times by weight of the binder.

9. The electrophotographic photoreceptor as claimed in claim 4, wherein the charge carrier-transporting medium comprises a binder and a charge carrier-transporting compound which is present in an amount of 0.2 to 2 times by weight of the binder.

10. The electrophotographic photoreceptor as claimed in claim 3, wherein the electrophotographic light-sensitive layer has a thickness of 3 to 20 μm.

11. The electrophotographic photoreceptor as claimed in claim 4, wherein the charge carrier-generating layer has a thickness of 4 to 0.01 μm, and the charge carrier-transporting medium layer has a thickness of 3 to 30 μm.

12. An optical information-recording medium which has an organic thin film containing one or more bisazulenium salt compounds of the general formulae (1) and (2) as claimed in claim 1.

13. The optical information-recording medium as claimed in claim 12, wherein the organic thin film contains a binder, and the bisazulenium salt compound is present in an amount of 5 to 90% by weight of the organic thin film.

14. The optical information-recording medium as claimed in claim 12, wherein the organic thin film has a thickness of 10 to 0.1 μm.

15. The optical information-recording medium as claimed in claim 13, wherein the organic thin film has a thickness of 10 to 0.1 μm.

* * * * *